United States Patent [19]

Komatsu

[11] Patent Number: 5,381,023
[45] Date of Patent: Jan. 10, 1995

[54] SEMICONDUCTOR DEVICE FOR CONTROL OF A SIGNAL LIGHT

[75] Inventor: Keiro Komatsu, Tokyo, Japan
[73] Assignee: NEC Corporation, Japan
[21] Appl. No.: 104,722
[22] Filed: Aug. 11, 1993
[30] Foreign Application Priority Data
   Aug. 11, 1992 [JP] Japan .................................. 4-214255
[51] Int. Cl.[6] .................. H01L 29/205; H01L 31/0304
[52] U.S. Cl. ........................................ 257/85; 257/94; 257/13; 257/184
[58] Field of Search ................... 257/21, 184, 113, 11, 257/85, 94, 13; 372/43, 96

[56] References Cited

U.S. PATENT DOCUMENTS

| | | | |
|---|---|---|---|
| 4,538,342 | 9/1985 | Camlibel et al. | 257/745 |
| 4,575,919 | 3/1986 | Logan et al. | 257/11 |
| 4,835,788 | 5/1989 | Yamaguchi | 372/96 |
| 5,181,086 | 1/1993 | Yoshida | 257/14 |
| 5,202,285 | 4/1993 | Sugano et al. | 257/79 |

FOREIGN PATENT DOCUMENTS 0044618  2/1991  Japan .

OTHER PUBLICATIONS

Proceedings of the 1991 IEICE Fall Conference. pp. 4–162, (in Japanese).
"Electronics Letters", Nov. 5th, 1987, vol. 23, No. 23, pp. 1232 to 1234.

Primary Examiner—Robert P. Limanek
Assistant Examiner—David B. Hardy
Attorney, Agent, or Firm—Laff, Whitesel, Conte & Saret

[57] ABSTRACT

In a ridge type or buried hetero type waveguide structure, a semiconductor layer functioning as one selected from a guiding layer, an absorption layer and an active layer includes InGaAsP mixed crystal, and semiconductor cladding layers include InGaAsP mixed crystal having a bandgap energy larger than that of the InGaAsP crystal layer included in the semiconductor layer functioning as one selected therefrom.

3 Claims, 5 Drawing Sheets

- 104 i-InGaAsP CLADDING LAYER ($\lambda g=1.15\mu m$)
- 103 i-InGaAsP ABSORPTION LAYER ($\lambda g=1.45\mu m$)
- 105 i-InP CLADDING LAYER
- 101 (100) PLANE n-InP SUBSTRATE
- 102 n-InGaAsP CLADDING LAYER ($\lambda g=1.15\mu m$)

- 108 SiO$_2$ FILM
- 108A WINDOW

- 201 SiO$_2$ FILM
- 202 GAP PORTION

- 109 p-ELECTRODE

- (111) B PLANE-RIDGE SIDE PLANE
- 107 p-InGaAs CAP LAYER
- 106 p-InP CLADDING LAYER

- 110 n-ELECTRODE

5,381,023

SEMICONDUCTOR DEVICE FOR CONTROL OF A SIGNAL LIGHT

FIELD OF THE INVENTION

The invention relates to a semiconductor device for control of a signal light, and more particularly to an optical semiconductor device used as an optical modulator, an optical switch, etc in an optical communication system, an optical information processing system, etc. in which the optical semiconductor device is coupled to a single mode optical fiber with low loss.

BACKGROUND OF THE INVENTION

An optical waveguide type signal light control device such as an optical modulator, an optical switch, etc. has been considered as a key element in an optical high speed communication system, an optical information processing system, etc., and the research and development thereof has been intensively active these days. As the optical waveguide type signal light control device, there are ones using a dielectric material such as LiNBO$_3$, etc. and the others using a semiconductor such as InP, GaAs, etc. Of the two kinds of optical waveguide type signal light control devices, the latter type is expected to be widely used as an optical semiconductor modulator, an optical semiconductor switch, etc., because it can be integrated with other optical devices such as an optical amplifier, etc. and an electronic circuit of FET, etc. to make the structure small and a voltage to be used therein low. For instance, such an optical modulator is described in Japanese Patent Kokai No.3-44618.

In a conventional InP system waveguide type signal light control device such as an optical modulator, an optical switch, etc. which is used in an optical communication system, an optical information processing system, etc. using a signal light of 1.3 and 1.55 μm bands, an guiding layer, an absorption layer, or an active layer for confining light comprises multi-quantum wells of InGaAsP mixed crystal, or this mixed crystal and InP, and cladding layers for sandwiching the guiding layer, the absorption layer, or the active layer is only of InP.

In the conventional waveguide type signal light control device, however, a radiation angle of light vertical to layers becomes large, because a refractive index difference is large between InGaAsP, especially, of a wavelength composition proximate to 1.55 μm and InP. Therefore, a large coupling loss occurs between the signal light control device and a single mode optical fiber. For reducing the large coupling loss, it is considered to decrease the radiation angle by decreasing a thickness of the guiding layer, the absorption layer or the active layer. In such a case, however, there is a disadvantage in that an operation voltage becomes high, because the confinement of light is deteriorated in the guiding layer, the absorption layer or the active layer.

In fabricating the conventional waveguide type signal light control device of InP system, a ridge portion or a mesa portion is prepared in either of a ridge type or a buried hetero type by using wet chemical etching. In this method, however, it is difficult to form a fine waveguide on a large area with high reproducibility. Further, side walls of the ridge or mesa portion are not of flat crystal planes, and a width thereof is deviated. As a result, scattering light loss is increased, and field pattern of a radiation light is not smooth, so that a coupling loss becomes large between the device and an optical fiber.

On the other hand, when dry etching is used, a fine waveguide is formed on a large area with high reproducibility. However, it can not be avoided in the presently available dry etching technology that minutely convex and concave surfaces are found on etching bottom and side planes to result in the occurrence of scattering loss for propagation lights. Further, the dry etching damages the etching bottom plane to also result in the occurrence of loss for the propagation lights. For there reasons, it is difficult to decrease the light loss in an optical semiconductor waveguide fabricated by using dry etching to an extent to that in an optical semiconductor waveguide fabricated by using wet chemical etching. Even worse, when a material is of InP system, there is a further disadvantage in that dry etching per se is not completed in technology.

SUMMARY OF THE INVENTION

Accordingly, it is an object of the invention to provide an InP system semiconductor device for control of a signal light in which a light radiation angle vertical to layers is decreased to decrease a coupling loss relative to a single mode optical fiber.

It is a further object of the invention to provide an InP system semiconductor device for control of a signal light in which a fine waveguide having low loss in formed without the process of etching a semiconductor.

According to the invention, a semiconductor device for control of a signal light, comprises:

a first semiconductor cladding layer on a semiconductor substrate;

a semiconductor layer inducing InGaAsP mixed crystal on the first semiconductor cladding layer for functioning as one selected from a guiding layer, an absorption layer and an active layer;

a second semiconductor cladding layer on the semiconductor layer included the InGaASP mixed crystal; and means for applying an electric field to the semiconductor layer including the InGaAsP mixed crystal;

wherein at least one of the first and second semiconductor cladding layers includes InGaAsP mixed crystal of a bandgap energy larger than the InGaAsP mixed crystal included in the semiconductor layer of the one selected.

BRIEF DESCRIPTION OF THE DRAWINGS

The invention will be described in more detail in conjunction with appended drawings, wherein.

DESCRIPTION OF THE PREFERRED EMBODIMENTS

Figure 1:
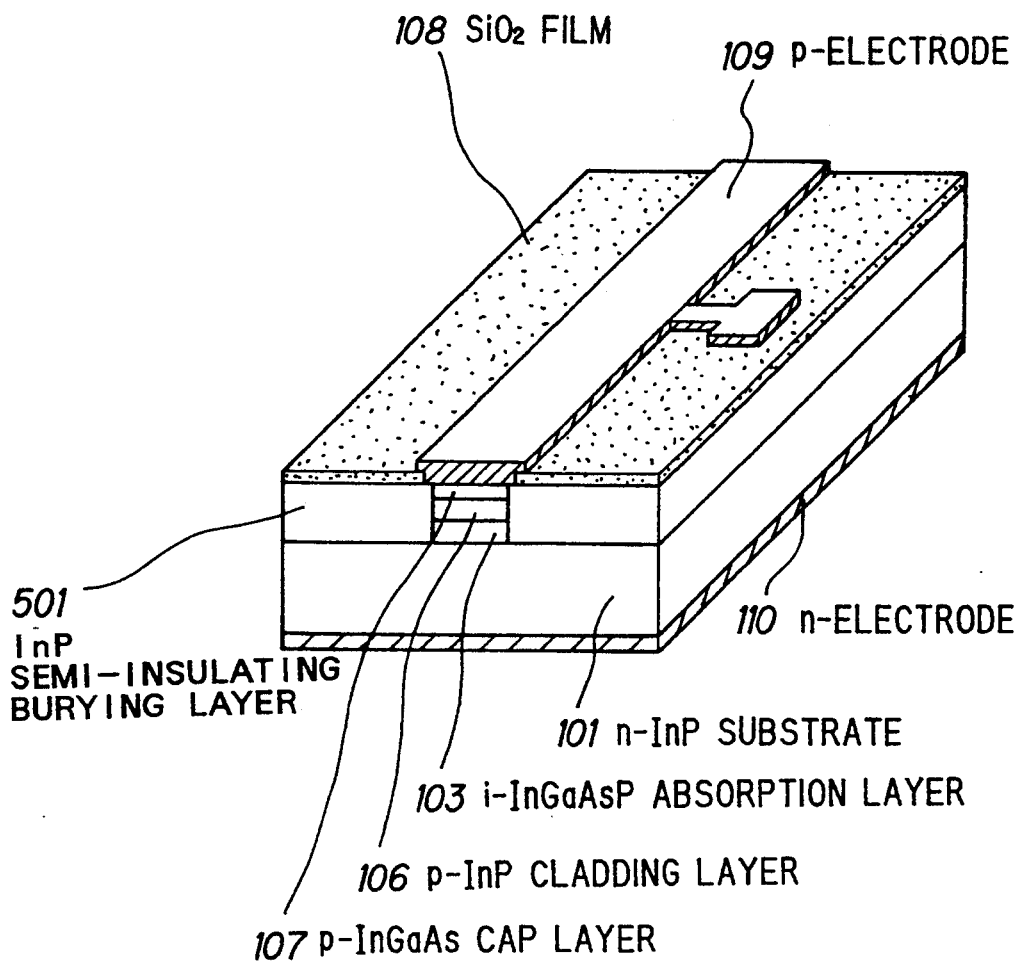
FIG. 1 is a schematic perspective view showing a conventional InP system semiconductor device for control of a signal light.

FIG. 1 shows the aforementioned conventional InP system an n-InP substrate 101, a stripe shaped i-InGaAsP absorption layer 103 formed on the substrate 101, a stripe shaped p-InP cladding layer 106 formed on the absorption layer 103, a stripe shaped p-InGaAs cap layer 107 formed on the cladding layer 106, a semi-insulating InP burying layer 501 for burying the stripe structure of the absorption, cladding and cap layers 103, 106 and 107, a SiO$_2$ film 108 formed on the burying layer 501, and p-and n-electrodes 109 and 110 for applying a predetermined voltage across the cap, cladding, and absorption layers 107, 106 and 103 and the substrate 101.

In the conventional InP system semiconductor device, the disadvantages discussed in the background of the invention are found.

Next, an InP system semiconductor device for control of a signal light in the first preferred embodiment according to the invention will be explained in FIG. 2.

The semiconductor device which is used as a ridge type optical modulator comprises an n-InP substrate 101 of (100) plane, an n-InGaAsP cladding layer 102 having a wavelength composition of 1.5 μm, an i-InGaAsP absorption layer 103 having a wavelength composition of 1.45 μm, an i-InGaAsP cladding layer 104 having a wavelength composition of 1.5 μm, an i-InP cladding layer 105, a p-InP cladding layer 106, a p-InGaAs cap layer 107, a SiO$_2$ film 108, and p- and n-electrodes 109 an 110.

Figure 3A:
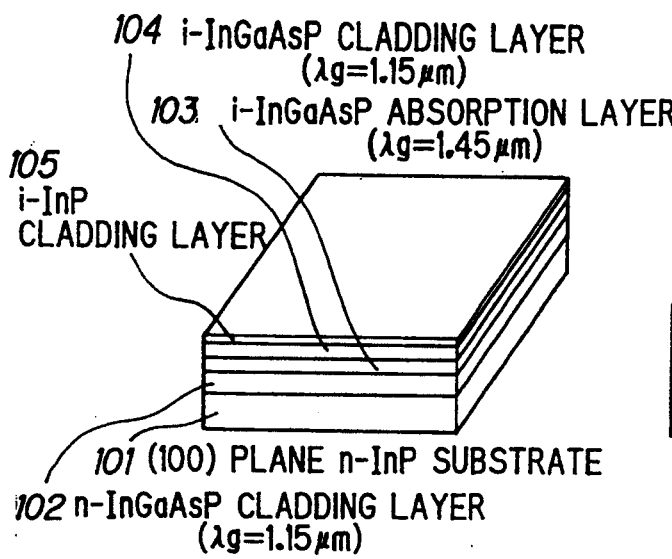
FIGS. 3A to 3F are schematic perspective views showing a method for fabricating the semiconductor device in the first preferred embodiment.

In fabricating the semiconductor device, as shown in FIG. 3A, the cladding layer 102 having a thickness of approximately 2.5 μm is formed on the substrate 101 by using metal organic vapor phase epitaxial (MOVPE) method, and the absorption layer 103 having a thickness of approximately 0.3 μm, the cladding layer 104 having a thickness of 0.1 μm, and the cladding layer 105 having a thickness of 0.05 μm are successively formed thereon by the MOVPE method.

Figure 3D:
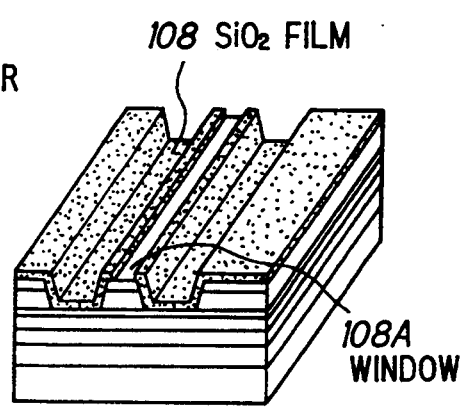
Figure 3B:
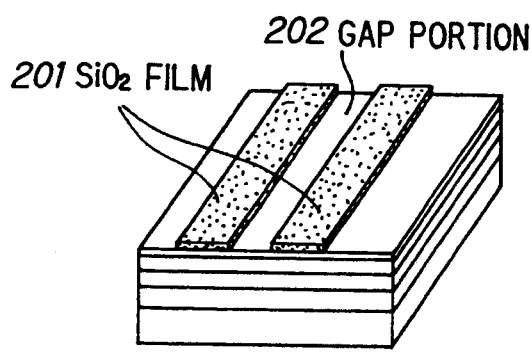

Next, the SiO$_2$ film 201 is formed thereon, as shown in FIG. 3B, and is patterned to provide masks in growing ridge portions selectively on stripe shaped gap portions 202 at a later stage by using photolithography technology, wherein a width of the SiO$_2$ film stripes 201 is 10 μm, and the gap portion stripes 202 are in the orientation of [011] and has a width of 4 μm.

Figure 3E:
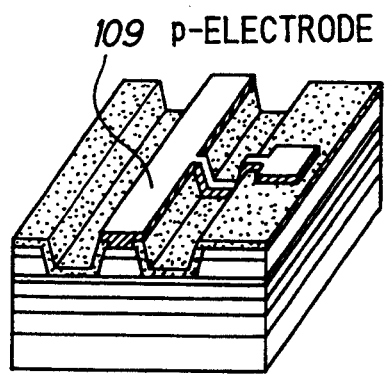
Figure 3C:
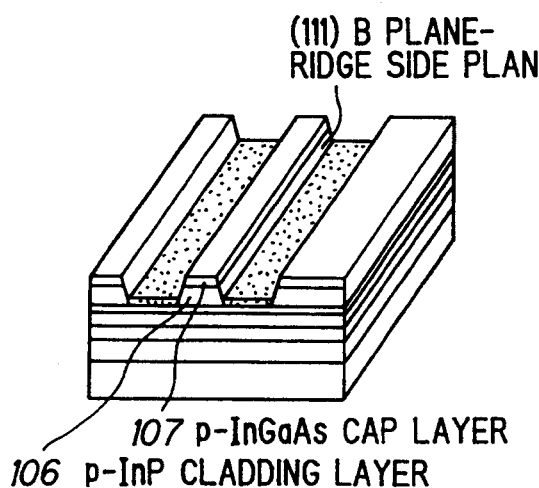

Next, the cladding layer 106 having a thickness of 0.7 μm and the cap layer 107 having a thickness of 0.2 μm are selectively grown on the gap portion stripes 202 by the MOVPE method, as shown in FIG. 3C. The ridges thus obtained are of (111)B plane on side surfaces which can be flat.

Then, the SiO$_2$ film masks 201 are removed, and a protective SiO$_2$ film 108 is formed on the top ridged surface, as shown in FIG. 3D. The protective film 108 is perforated with a window 108A for p-electrode contact, on which a p-electrode 109 is provided, as shown in FIG. 3E.

Figure 3F:
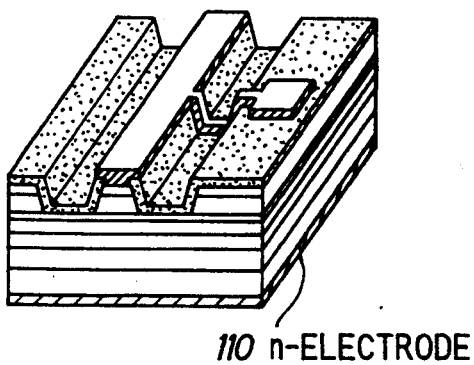

Finally, the n-InP substrate 101 is polished to have a thickness of approximately 100 μm, and an n-electrode 110 of Cr/Au is provided on the polished surface of the n-InP substrate 101, while anti-reflection coatings are provided on light input and output facets, as shown in FIG. 3F.

In operation of the optical modulator this fabricated, the wavelength composition of the absorption layer 103 is set to be 1.45 μm, so that an incident light of 1.55 μm is transmitted through the optical modulator to supply on output light, when a reverse bias voltage is not applied across the p- and n-electrodes 109 and 110. Thus, the optical modulator is turned on. On the other hand, when the reverse bias voltage is applied across the p- and n-electrodes 109 and 110, an electric field is applied to the i-InGaAsP absorption layer 103, so that the absorption edge end thereof extends in the direction of long wavelength side in accordance with Franz-Keldysh effect. Consequently, the incident light having the wavelength of 1.55 μm is absorbed to result in loss. Thus, the optical modulator is turned off. In this manner, an output light is controlled in intensity dependently on the application of the reverse bias voltage across the p- and n-electrodes 109 and 110. This is a function as an optical modulator.

Figure 4:
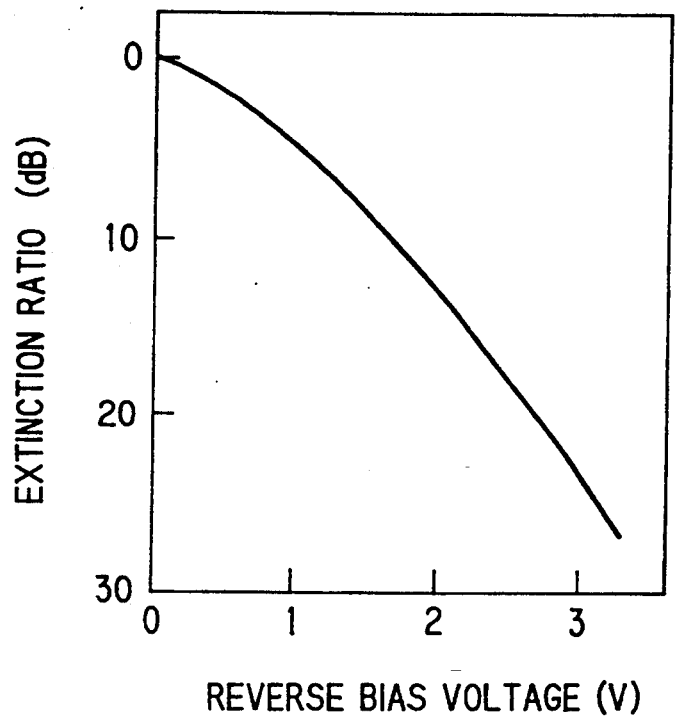
FIG. 4 is a graph explaining an estimation property in the semiconductor device in the first preferred embodiment.

FIG. 4 shows the light extinction ratio relative to a reverse bias voltage under the conditions that a device length is 300 μm and a wavelength of light is 1.55 μm. As clearly shown therein, an excellent light extinction ratio property is realized in the InP system optical modulator as shown in FIG. 2 in that, for instance, the light extinction ratio of 23 dB is obtained by the reverse bias voltage of 3 V.

In this preferred embodiment, the cladding layer 102 and 104 for sandwiching the i-InGaAsP absorption layer 103 are of InGaAsP having the wavelength composition of 1.5 μm which is different from InP in the conventional device. For this structure, a refractive index difference becomes small between each of the cladding layers 102 and 104 and the absorption layer 103, so that a vertical radiation angle is decreased to reduce a coupling loss relative to a single mode optical fiber.

Figure 5:
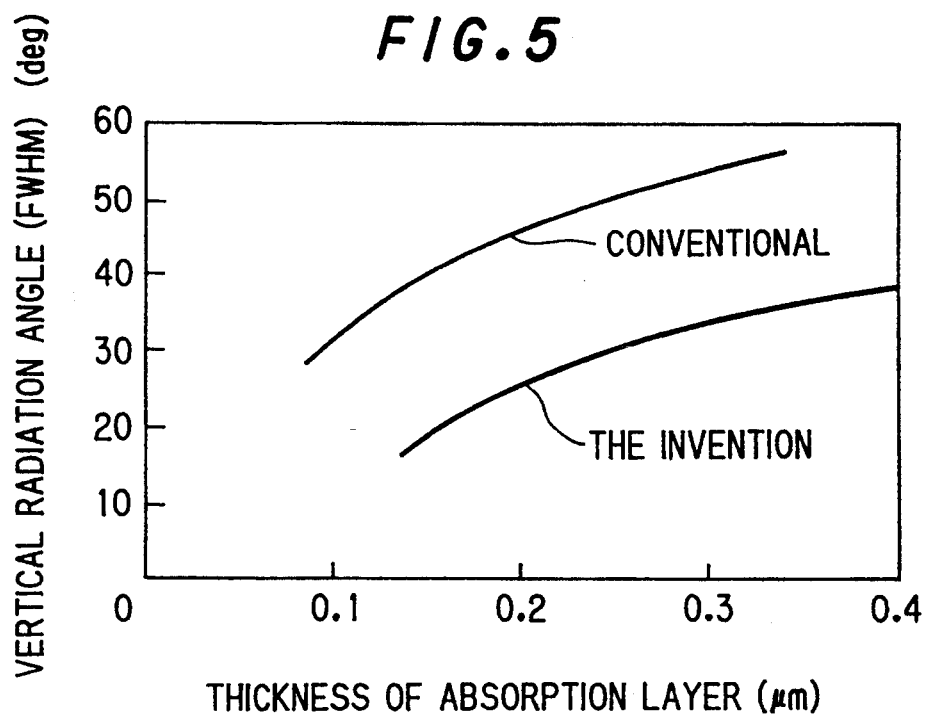
FIG. 5 is a graph explaining vertical radiation angles in the conventional semiconductor device and semiconductor device in the preferred embodiment.

FIG. 5 shows the vertical radiated angle relative to a thickness of a light absorption layer, wherein the results are obtained in accordance with the calculation for the invention in which cladding layers are of InGaAsP and the convention structure in which cladding layers are of InP. As clearly understood from FIG. 5, the vertical radiation angle is more than 50° in the conventional structure, when a thickness of the absorption layer is approximately 0.3 μm to be often designed practically. Therefore, unless a thickness of the absorption layer is less than 0.1 μm in the conventional structure, it is not realized that the vertical radiation angle is 3° which is required for the reduction of the coupling loss relative to a single mode optical fiber. However, if the absorption layer is as thin as 0.1 μm, the light confinement of the absorption layer is deteriorated to result in the significant increase of an operation voltage.

On the other hand, the vertical radiation angle of 3° is realized in the invention, when a thickness of the absorption layer 103 is 0.3 μm which does not lower the light confinement therein, so that the aforementioned light extinction ratio is obtained. This is confirmed in an experiment.

Figure 2:
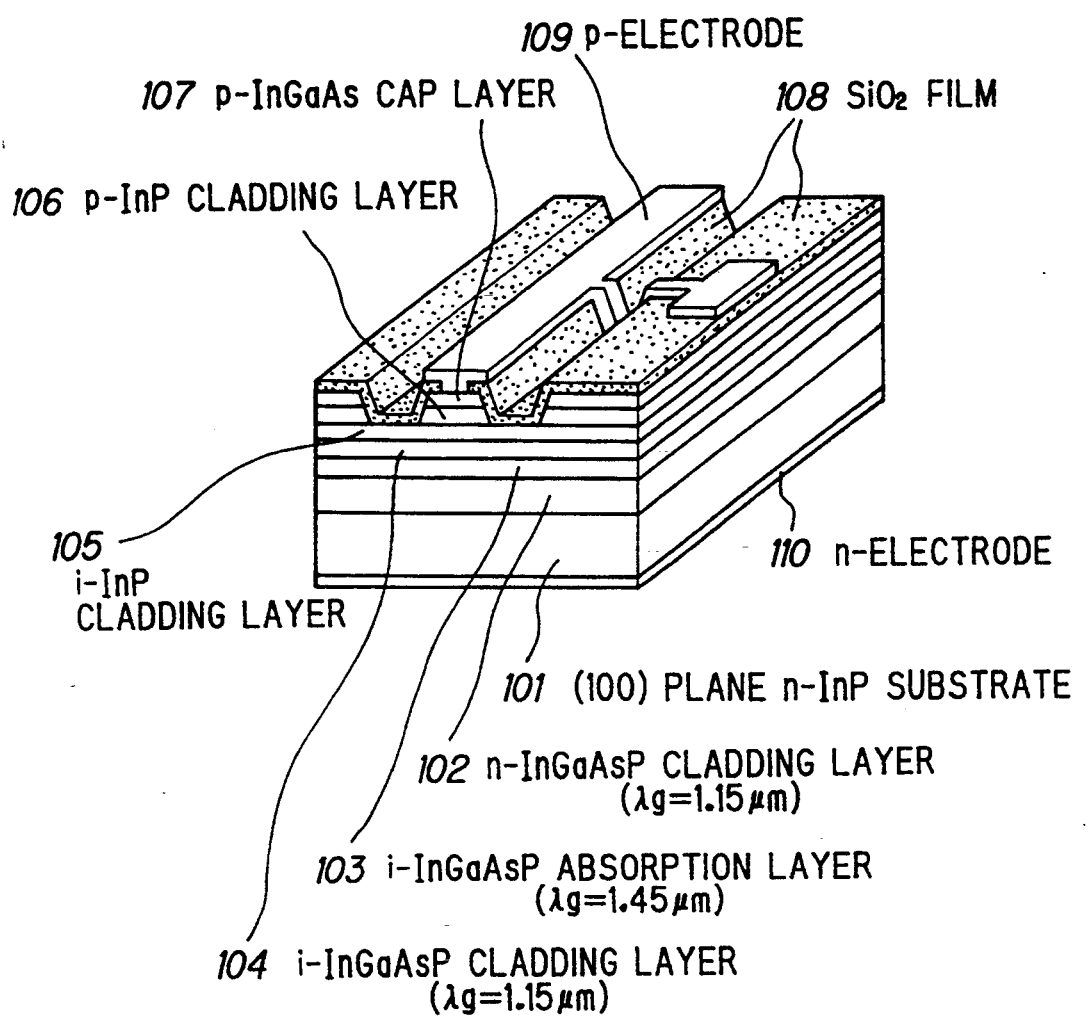
FIG. 2 is a schematic perspective view showing a InP system semiconductor device for control of a signal light in a first preferred embodiment according to the invention.

In one of experiments carried out by the inventor, it is also confirmed that a full width half maximum is 41° in vertical radiation angle for the optical modulator as shown in FIG. 2, while that in the conventional semiconductor device as shown in FIG. 1 is 57°. In a system in which a non-spherical lens is positioned between the optical modulator as shown in FIG. 2 and a single mode optical fiber, a coupling loss relative the single mode optical fiber is measured to be 3.2 dB which s lower than that is the conventional structure as shown in FIG. 1 by approximately 1 dB.

In the invention using InGaAsP for the cladding layers 102 an 104, an energy difference relative to a propagation light is small as compared to that in the conventional structure, so that it may be predicted to increase loss in the cladding layers 102 and 104. However, it is confirmed by the inventor that extremely low loss is obtained for wavelength of 1.3 $\mu$m and 1.55 $\mu$m in a selective ridge growth waveguide using InGaAsP of 1.5 $\mu$m wavelength composition for a guiding layer, as described in a report "C-132, the Institute of Electronics Information and Communication Engineer, autumn national conference, 1991 (in Japanese)". In accordance with the report, InGaAsP having the wavelength composition of 1.5 $\mu$m can be used for cladding layers in an optical modulator for a wavelength of 1.55 $\mu$m signal light. Therefore, if a wavelength composition of InGaAsP mixed crystal for the cladding layers 102 and 104 is approximately selected, no loss occurs at a wavelength for propagation light in the cladding layers 102 and 104, and a vertical radiation angle becomes small by making a refractive index difference small between each of the cladding layers 102 and 104 and the absorption layer 103. Consequently, a coupling loss of the optical modulator to a single mode optical fiber is decreased in the invention.

In the first preferred embodiment, the ridges are formed by the selective growth, so that flat crystal surfaces are obtained on whole planes including ridge side planes. Consequently, loss caused by light scattering which is never avoided in the conventional structure having the optical waveguide fabricated by etching, as shown in FIG. 1, never occurs in the first preferred embodiment. Further, filed pattern of the output light becomes smooth in the first preferred embodiment, so that a coupling loss of the optical modulator to a single mode optical fiber is decreased. Consequently, an optical modulator having a largely decreased waveguide loss is realized in the invention. This means that an insertion loss of an optical modulation is also decreased between single mode optical fibers.

Figure 6:
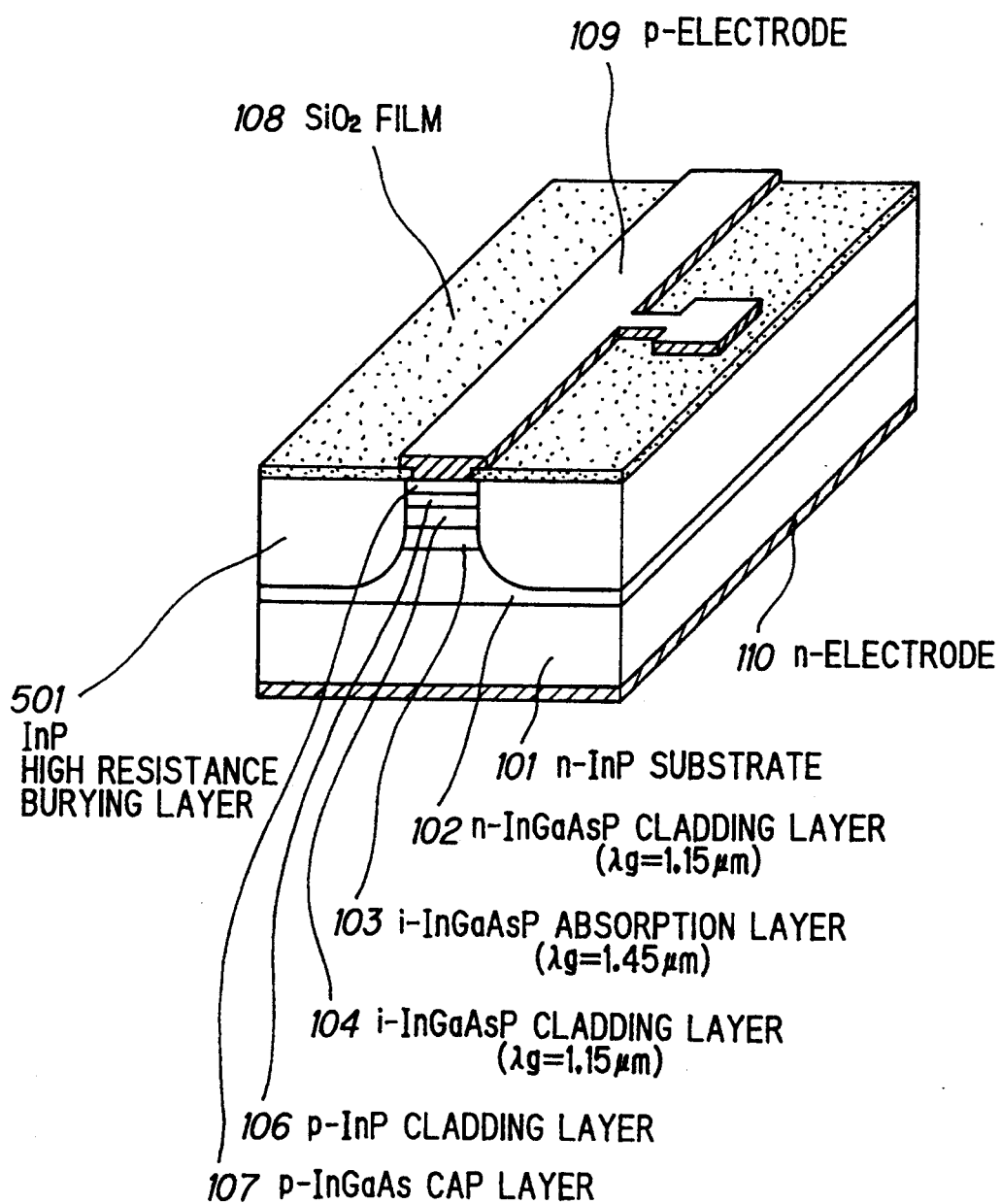
FIG. 6 is a schematic perspective view showing an system semiconductor device for control of a signal light in a second preferred embodiment according to the invention.

FIG. 6 shows an InP system semiconductor device for control of a signal light in the second preferred embodiment according to the invention, in which the semiconductor device functions as an InP system burying type optical modulator.

The burying type optical modulator is fabricated by a method as set out below.

On an n-InP substrate 101 of (100) plane, a n-InGaAsP cladding layer 102 having a wavelength composition of 1.5 $\mu$m and a thickness of approximately 2.5 $\mu$m, an i-InGaAsP absorption layer 103 having a wavelength composition of 1.45 $\mu$m and a thickness of 0.3 $\mu$m, a i-InGaAsP cladding layer 104 having a wavelength composition of 1.5 $\mu$m and a thickness of 0.2 $\mu$m, a p-InP cladding layer 106 having a thickness of 0.6 $\mu$m, and a p-InGaAs cap layer 107 are successively formed by the MOVPE method. Next, a stripe shaped SiO$_2$ film for a mask having a width of approximately 3 $\mu$m is formed on the cap layer 107 by photolithography, and the layers thus grown are removed in the midst of the cladding layer 102 except for a central mesa portion having a width of approximately 2 $\mu$m by wet chemical etching. Next, a semi-insulating resistance InP 501 doped with Fe is selectively crystal-grown on the etched portions by the MOVPE method using the SiO$_2$ film mask. Then, the mask is removed, and a protective SiO$_2$ film 108 is formed on the top surface of the mesa stripe and the high resistance InP portions 501. The protective SiO$_2$ film 108 is perforated with a window for a p-electrode contact, and a p-electrode 109 Cr/Au is provided to contact via the window with the cap 107. Finally, the n-InP substrate 101 is polished to have a thickness of approximately 100 $\mu$m, and an n-electrode 110 is provided on the polished surface of the substrate 101, while anti-reflection coatings are provided on facets of light input and output end planes.

In operation, the wavelength composition of the i-InGaAsP absorption layer 103 is set to be 1.45 $\mu$m, so that an input light having a wavelength of 1.55 $\mu$m is transmitted through the device to supply an output light, when a reverse bias voltage is not applied across the p- and n-electrodes 109 and 110. Thus, the optical modulator is turned on. On the other hand, when the reverse bias voltage is applied across the p- and n-electrodes 109 and 110, so that an electric field is applied to the i-InGaAsP absorption layer 103, absorption end extends in the direction of long wavelength side in accordance with Franz-Keldysh effect. As a result, loss occurs in the input light having he wavelength of 1.55 $\mu$m due to the absorption therein. Thus, the optical modulator is turned off. In this manner, the optical modulator operates to supply the output light having an intensity dependent on a reverse bias voltage applied across the p- and n-electrodes 109 and 110. When a device length of the optical modulator is 300 $\mu$m, an extinction ratio more than 20 dB is obtained at a wavelength of 1.55 $\mu$m by a reverse bias voltage of 3 V. That is, the similar excellent extinction ratio property to the first preferred embodiment obtained in the second preferred embodiment.

The same advantage on a vertical radiation angle and a coupling loss to a single mode optical fiber as in the first preferred embodiment are also obtained in the second preferred embodiment for the same reasons explained in the first preferred embodiment.

Although the invention has been described with respect to specific embodiment for complete and clear disclosure, the appended claims are not to be thus limited but are to be construed as embodying all modification and alternative constructions that may occur to one skilled in the art which fairly fall within the basic teaching here is set forth.

What is claimed is:

1. A semiconductor device for control of a signal light, said device comprising:

a first semiconductor cladding layer on a semiconductor substrate;

a semiconductor layer including an InGaAsP mixed crystal for functioning as one selected from a guiding layer, an absorption layer, and an active layer;

said semiconductor layer including said InGaAsP mixed crystal and said one selected layer being of said InGaAsP mixed crystal having a wavelength composition of 1.45 $\mu$m;

a second semiconductor cladding layer on said semiconductor layer including said InGaAsP mixed crystal;

said first and second semiconductor cladding layers being said InGaAsP mixed crystal having a wavelength composition of 1.5 $\mu$m;

a third semiconductor cladding layer on said second semiconductor cladding layer;

a semiconductor cap layer on said third semiconductor cladding layer; and means for applying an electric field to said semiconductor layer including said InGaAsP mixed crystal;

wherein at least said semiconductor cap layer and said third cladding layer are shaped to provide a ridge type waveguide in cooperation with said first and second semiconductor cladding layers and said semiconductor layer including said InGaAsP crystal layer; and at least one of said first to third semiconductor cladding layers includes an InGaAsP mixed crystal having a bandgap energy which is larger than said InGaAsP mixed crystal included in said semiconductor layer of said one selected; and said ridge type waveguide is formed by selective crystal growth, so that side planes of ridge thereof is an (111) plane.

2. A semiconductor device for control of a signal light, said device comprising:

a first semiconductor cladding layer on a semiconductor substrate;

a semiconductor layer including an InGaAsP mixed crystal on said first semiconductor cladding layer for functioning one selected from a guiding layer, an absorption layer, and an active layer;

said semiconductor layer including said InGaAsP mixed crystal and said one selected layer being of said InGaAsP mixed crystal having a wavelength composition of 1.45 μm;

a second semiconductor cladding layer on said semiconductor layer including said InGaAsP mixed crystal;

said first and second semiconductor cladding layers being said InGaAsP mixed crystal having a wavelength composition of 1.5 μm;

a third semiconductor cladding layer on said second semiconductor cladding layer; and a semiconductor cap layer on said third semiconductor cladding layer;

said first to third cladding layers, said semiconductor layer including said InGaAsP mixed crystal, and said semiconductor cap layer are shaped to provide a mesa strip, said mesa stripe being buried on both sides thereof with a low refractive index material to provide a burying type waveguide; and at least one of said first to third semiconductor cladding layers includes an InGaAsP mixed crystal having a bandgap energy which is larger than said InGaAsP mixed crystal included in said semiconductor layer of said one selected layer.

3. A semiconductor device for controlling a signal light, said device comprising:

a first cladding layer of n-InGaAsP having a predetermined wavelength composition provided on a n-InP substrate;

a semiconductor core layer of i-InGaAsP having predetermined wavelength composition provided on said first cladding layer;

a second cladding layer of i-InGaAsP having a predetermined wavelength composition provided on said semiconductor core layer;

a third cladding layer of p-InP provided on said second cladding layer;

a fourth cladding layer of i-InP provided between said second and third cladding layers;

means for applying an electric field to said semiconductor core layer;

wherein said predetermined wavelength compositions of said first and second cladding layers are less than said predetermined wavelength composition of said semiconductor core layer.

* * * * *